United States Patent
Yang et al.

(10) Patent No.: US 12,492,754 B2
(45) Date of Patent: Dec. 9, 2025

(54) VALVE NEEDLE ASSEMBLY, ELECTRONIC EXPANSION VALVE AND REFRIGERATION DEVICE

(71) Applicant: GUANGDONG WELLING MOTOR MANUFACTURING CO., LTD., Guangdong (CN)

(72) Inventors: Mao Yang, Guangdong (CN); Longhua Huang, Guangdong (CN); Chao Chen, Guangdong (CN); Bo Jiang, Guangdong (CN)

(73) Assignee: GUANGDONG WELLING MOTOR MANUFACTURING CO., LTD., Guangdong (CN)

( * ) Notice: Subject to any disclaimer, the term of this patent is extended or adjusted under 35 U.S.C. 154(b) by 222 days.

(21) Appl. No.: 18/205,186

(22) Filed: Jun. 2, 2023

(65) Prior Publication Data
US 2023/0304588 A1    Sep. 28, 2023

Related U.S. Application Data

(63) Continuation of application No. PCT/CN2021/120610, filed on Sep. 26, 2021.

(30) Foreign Application Priority Data

Dec. 14, 2020    (CN) .......................... 202011482751.3

(51) Int. Cl.
*F16K 1/48*    (2006.01)
*F16K 1/38*    (2006.01)
*F25B 41/35*    (2021.01)

(52) U.S. Cl.
CPC .................. *F16K 1/48* (2013.01); *F16K 1/38* (2013.01); *F25B 41/35* (2021.01)

(58) Field of Classification Search
CPC ............. F16K 1/48; F25B 41/31; F25B 41/35
See application file for complete search history.

(56) References Cited

U.S. PATENT DOCUMENTS

| | | | |
|---|---|---|---|
| 8,157,183 B2* | 4/2012 | Hayashi | F25B 41/35 236/92 B |
| 2011/0012038 A1 | 1/2011 | Lv et al. | |
| 2019/0368618 A1* | 12/2019 | Wei | F16K 1/52 |

FOREIGN PATENT DOCUMENTS

| CN | 202149235 U | 2/2012 |
|---|---|---|
| CN | 103883749 A | 6/2014 |

(Continued)

OTHER PUBLICATIONS

Notice of Reasons for Refusal dated Jan. 30, 2024 received in Japanese Patent Application No. JP 2023-532626.

(Continued)

*Primary Examiner* — Eric Keasel
(74) *Attorney, Agent, or Firm* — Scully, Scott, Murphy & Presser, P.C.

(57) ABSTRACT

A valve needle assembly, an electronic expansion valve and a refrigeration device are provided. The valve needle assembly has a valve needle sleeve, a valve rod, a valve needle, a buffer slider and a buffer spring. The valve needle sleeve has a first open end and a second open end opposite to each other. The valve rod has a driving end movably matched with the valve needle sleeve through the first open end to drive the valve needle provided on the second open end. The buffer slider is provided in the valve needle sleeve and abuts against the valve needle. The buffer spring is provided in the valve needle sleeve, through which the driving end is connected to the buffer slider.

16 Claims, 4 Drawing Sheets

(56) References Cited

FOREIGN PATENT DOCUMENTS

| CN | 107461498 | A  | 12/2017 |
|----|-----------|----|---------|
| CN | 207864635 | U  | 9/2018  |
| CN | 208634406 | U  | 3/2019  |
| CN | 209012516 | U  | 6/2019  |
| CN | 112696499 | A  | 4/2021  |
| CN | 214171340 | U  | 9/2021  |
| CN | 116697055 | A  | 9/2023  |
| JP | 2003148643 | A | 5/2003  |
| JP | 2003329158 | A | 11/2003 |
| JP | 4220178   | B2 | 2/2009  |
| WO | 2013103061 | A1 | 7/2013 |

OTHER PUBLICATIONS

Extended European Search report dated Mar. 27, 2024 received in European Patent Application No. EP 21905196.8.
First Office Action dated Dec. 29, 2024 for Chinese Patent Application No. 202011482751.3.
Shaowei et al., Analysis On The Transformation Of Needle-Shaped Valve And Its Energy Dissipation Mode In Huizhu Upstream Diversion Tunnel, Guangdong Water Resources and Hydropower, Publication No. 7, Jul. 2016.
International Search Report and Written Opinion dated Jan. 6, 2022 received in International Application No. PCT/CN2021/120610.
Second Office Action dated Jun. 27, 2025 received in Chinese Patent Application No. 202011482751.3.

* cited by examiner

VALVE NEEDLE ASSEMBLY, ELECTRONIC EXPANSION VALVE AND REFRIGERATION DEVICE

CROSS-REFERENCE TO RELATED APPLICATIONS

The present application is a continuation application of PCT International Patent Application No. PCT/CN2021/120610, filed on Sep. 26, 2021, which claims priority to and benefits of Chinese Patent Application No. 202011482751.3, filed on Dec. 14, 2020, the entire contents of each of which are incorporated herein by reference for all purposes. No new matter has been introduced.

FIELD

The present application relates to the field of control valve, and in particular, to a valve needle assembly, an electronic expansion valve and a refrigeration device.

BACKGROUND

At present, electronic expansion valves use the principle of stepping motors to drive the magnetic rotor to rotate by the coil, and convert the rotational motion of the magnetic rotor into the axial movement of the valve rod. The valve rod drives the valve needle connected to it to rise or fall in order to control the flow rate of the electronic expansion valve.

In the related art, the electronic expansion valve mainly includes a rotor, a valve rod, a nut and a valve needle. The valve rod is rotatably connected to the nut, the valve needle is provided at the lower end of the valve rod, and the rotor drives the valve rod to move axially, and then drives the valve needle to move axially, so as to block and open the valve port. However, with the above structure, when the valve port is blocked and opened, the valve needle will rotate relative to the valve port, resulting in wear of the valve needle and the valve port, thereby reducing the service life of the valve needle.

The above content is only used to assist in understanding the technical solution of the present application, and does not mean that the above content is admitted as related art.

SUMMARY

The main purpose of the present application is to provide a valve needle assembly, which aims to solve at least the technical problem in the related art that the valve needle will rotate relative to the valve port, causing the valve needle to be prone to wearing.

In order to achieve the above purpose, the present application provides a valve needle assembly applied in an electronic expansion valve, the valve needle assembly includes:
  a valve needle sleeve provided with a first open end and a second open end opposite to the first open end;
  a valve rod provided with a driving end movably matched with the valve needle sleeve through the first open end to drive a valve needle;
  the valve needle provided on the second open end of the valve needle sleeve;
  a buffer slider provided in the valve needle sleeve, and abutting against the valve needle; and
  a buffer spring provided in the valve needle sleeve; wherein the driving end of the valve rod is connected with the buffer slider through the buffer spring.

In an embodiment, a flange portion is provided on the peripheral wall of the driving end of the valve rod, the flange portion is in the valve needle sleeve; the first open end of the valve needle sleeve is provided with a constricted portion abutting against the flange portion; and one end of the buffer spring is sleeved on the driving end of the valve rod and abuts against the flange portion.

In an embodiment, a positioning column is provided on the side of the buffer slider facing the valve rod, and the other end of the buffer spring is sleeved on the positioning column and abuts against the buffer slider.

In an embodiment, a cross-sectional diameter of the valve needle sleeve is larger than a cross-sectional diameter of the flange portion.

In an embodiment, the buffer slider is provided with a protrusion protruding toward the valve needle, and the buffer slider abuts against the valve needle through the protrusion.

In an embodiment, the surface of the protrusion is an arc surface.

In an embodiment, the inner diameter of the valve needle sleeve is larger than the outer diameter of the buffer slider.

In an embodiment, a limiting protrusion is provided on the outer wall of the buffer slider, and the limiting protrusion is provided along the circumferential direction of the buffer slider.

In an embodiment, there are at least two limiting protrusions, and the at least two limiting protrusions are distributed along the circumferential direction of the buffer slider at intervals;

In an embodiment, the limiting protrusion is an annular rib extending along the circumferential direction of the buffer slider.

In an embodiment, the second open end of the valve needle sleeve is an opening, and the outer wall surface of the valve needle is in interference fit with the opening.

In an embodiment, the buffer spring is a compression spring.

In an embodiment, the buffer slider is made of plastic material.

The present application also provides an electronic expansion valve. The electronic expansion valve includes a nut and a valve needle assembly. The nut is provided with a mounting hole. The valve needle assembly includes:
  a valve needle sleeve provided with a first open end and a second open end opposite to the first open end;
  a valve rod passing through the mounting hole and threadedly connected to the nut, wherein the valve rod has a driving end, and the driving end of the valve rod is movably matched with the valve needle sleeve through the first open end to drive the valve needle;
  a valve needle provided on the second open end of the valve needle sleeve;
  a buffer slider, provided in the valve needle sleeve and abutting against the valve needle; and
  a buffer spring provided in the valve needle sleeve; wherein the driving end of the valve rod is connected to the buffer slider through the buffer spring.

In an embodiment, the electronic expansion valve further includes a valve seat and a valve core seat. The valve core seat is provided on the valve seat and has a valve port, and the valve needle is detachably mounted on the valve port. The nut is connected to the valve seat, and the nut extends toward the valve core seat to approach or abut against the valve core seat.

In an embodiment, a refrigerant outlet is provided on the side wall of the nut near the end of the valve core seat.

The present application also provides a refrigeration device, including an electronic expansion valve. The electronic expansion valve includes a nut and a valve needle assembly, and the nut is provided with a mounting hole. The valve needle assembly includes:

a valve needle sleeve provided with a first open end and a second open end opposite to the first open end;

a valve rod passing through the mounting hole and threadedly connected to the nut, wherein the valve rod has a driving end, and the driving end of the valve rod is movably matched with the valve needle sleeve through the first open end to drive the valve needle;

a valve needle provided on the second open end of the valve needle sleeve;

a buffer slider provided in the valve needle sleeve, and abutting against the valve needle; and a buffer spring provided in the valve needle sleeve; wherein the driving end of the valve rod is connected to the buffer slider through the buffer spring.

The valve needle assembly of the present application includes a valve needle sleeve, a valve rod, a valve needle, a buffer slider and a buffer spring. The valve needle sleeve is provided with a first open end and a second open end opposite to the first open end. The valve rod has a driving end. The valve rod is installed through the first open end, and the driving end of the valve rod is movably matched with the valve needle sleeve through the first open end to drive the valve needle. The valve needle is provided on the second open end of the valve needle sleeve. The buffer slider is provided in the valve needle sleeve, and the buffer slider abuts against the valve needle. The buffer spring is provided in the valve needle sleeve, and the driving end of the valve rod is connected to the buffer slider through the buffer spring. In this way, when the valve needle is opened from the fully closed state to the first position (that is, the position where the contact force between the valve port and the valve needle is equal to the pressure of the refrigerant), the valve needle and the valve port always maintain sealing contact, and the valve rod drives the buffer spring and the buffer slider to rotate together, while the valve needle remains stationary; when the valve needle continues to open to the second position (that is, the position of the valve opening pulse point), the valve needle and the valve port continue to maintain sealing contact at first, and after the valve rod moves axially to abut against the valve needle sleeve, the valve needle will move together with the valve rod. Therefore, the valve needle assembly of the present application greatly reduces wear between the valve needle and the valve port, prolongs the service life of the valve needle assembly, and improves the reliability of the electronic expansion valve.

BRIEF DESCRIPTION OF THE DRAWINGS

In order to more clearly illustrate the embodiments of the present application or the technical solutions in the related art, the accompanying drawings that need to be used in the description of the embodiments or the related art will be briefly introduced below. Obviously, the accompanying drawings in the following description are only some embodiments of the present application, and those skilled in the art can also obtain other drawings according to the structures shown in these drawings without creative effort.

Description of reference signs are listed as follows.

| Reference sign | Name | Reference sign | Name |
| --- | --- | --- | --- |
| 200 | electronic expansion valve | 120 | valve needle sleeve |
| 210 | outer cover | 121 | first open end |
| 220 | valve seat | 122 | constricted portion |
| 230 | valve core seat | 123 | second open end |
| 231 | valve port | 130 | buffer spring |
| 240 | nut | 140 | buffer slider |
| 241 | mounting hole | 141 | positioning column |
| 242 | refrigerant outlet | 142 | protrusion |
| 250 | magnetic rotor | 143 | limiting protrusion |
| 100 | valve needle assembly | 150 | valve needle |
| 110 | valve rod | 151 | main body |
| 111 | driving end | 152 | mounting portion |
| 112 | flange portion | | |

The realization of the purpose of the present application, functional characteristics and advantages will be further described with reference to the accompanying drawings in conjunction with the embodiments.

DETAILED DESCRIPTION OF EMBODIMENTS

It should be noted that if there are descriptions involving "first", "second", etc. in the embodiments of the present application, the descriptions of "first", "second", etc. are only for description purposes, and should not be interpreted as indicating or implying their relative importance or implying the number of technical features indicated. Thus, the features defined as "first" and "second" may explicitly or implicitly include at least one of these features. In addition, the meaning of "and/or" appearing in the whole text includes three parallel schemes. For example, "A and/or B" includes only A, or only B, or both A and B.

The present application provides an electronic expansion valve.

Figure 1:
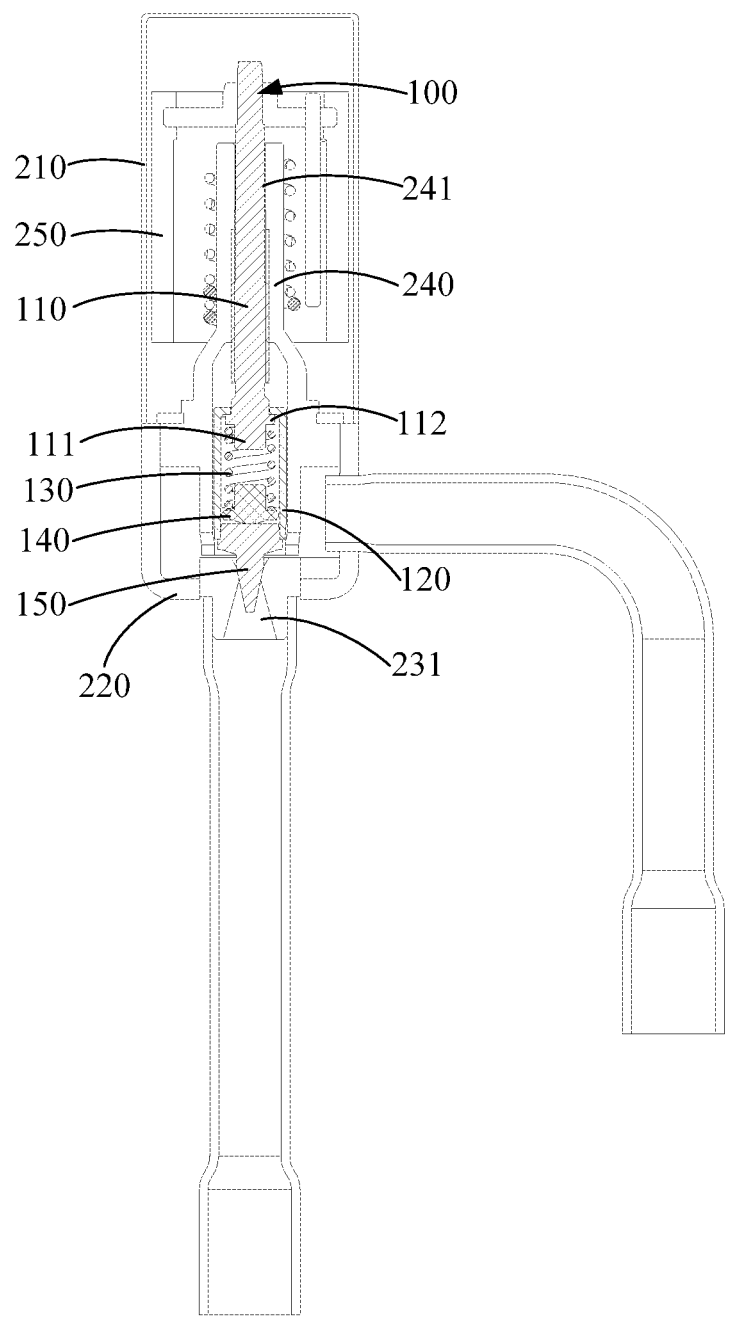
FIG. 1 is a schematic view of the internal structure of an electronic expansion valve according to an embodiment of the present application.
Figure 2:
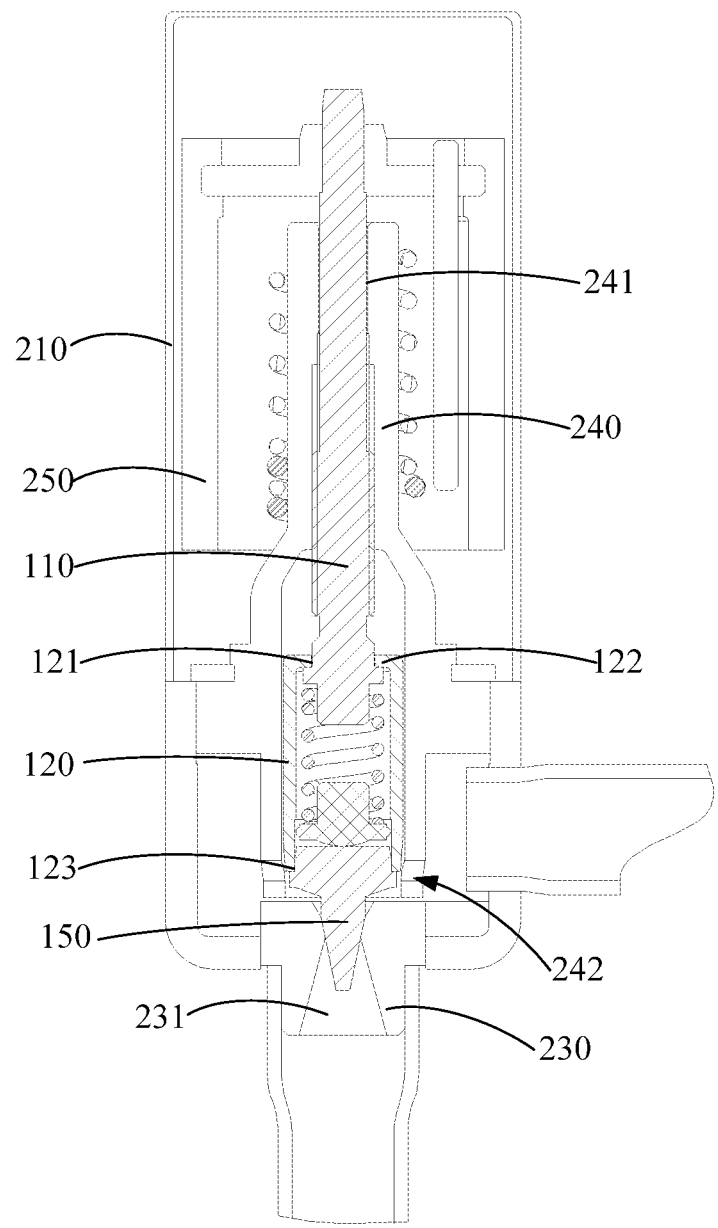
FIG. 2 is a partial structural schematic view of the electronic expansion valve in FIG. 1.
Figure 3:
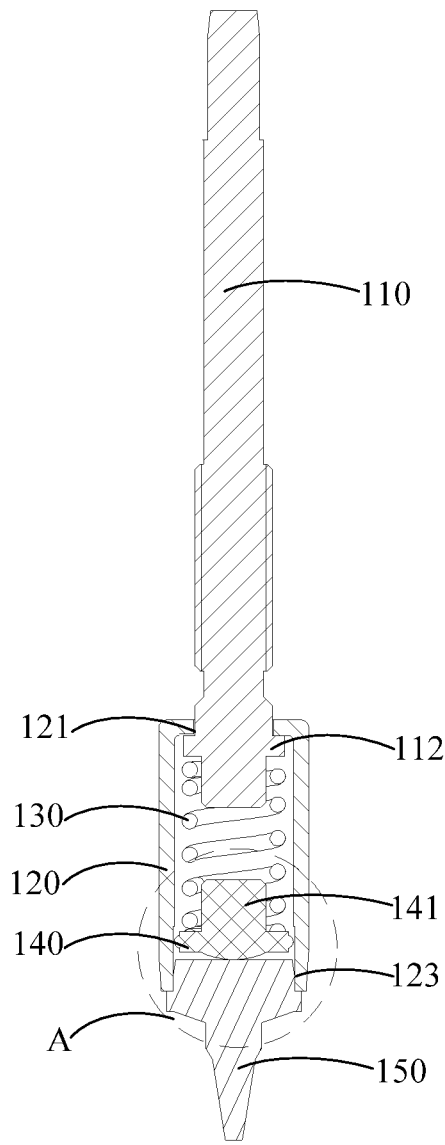
FIG. 3 is a structural schematic view of an embodiment of the valve needle assembly in FIG. 2.

As shown in FIG. 1, FIG. 2 and FIG. 3, the electronic expansion valve 200 provided by the present application includes a valve body. The valve body includes an outer cover 210, a valve seat 220 fixedly connected with the outer cover 210, a magnetic rotor 250 capable of rotating in the outer cover 210, a nut 240, and a valve needle assembly 100. The outer cover 210 and the valve seat 220 are enclosed to form a valve cavity, and the magnetic rotor 250, the nut 240, and the valve needle assembly 100 are all provided in the valve cavity. The nut 240 is connected to the valve seat 220, and the magnetic rotor 250 drives the valve needle assembly 100 to control the flow rate of the electronic expansion valve 200.

The structure of the valve needle assembly 100 will be articulated as follows.

As shown in FIG. 1, FIG. 2 and FIG. 3, the present application provides the valve needle assembly 100 applied in an electronic expansion valve 200. The valve needle assembly 100 includes a valve needle sleeve 120, a valve rod 110, a valve needle 150, a buffer slider 140 and a buffer spring 130. The valve needle sleeve 120 has a first open end 121 and a second open end 123 opposite to each other. The valve rod 110 has a driving end 111, and the valve rod 110 is set through the first open end 121. The driving end 111 of the valve rod 110 is movably matched with the valve needle sleeve 120 through the first open end 121 to drive the valve needle 150 to move. The valve needle 150 is mounted on the second open end 123 of the valve needle sleeve 120. The buffer slider 140 is provided in the valve needle sleeve 120, and the buffer slider 140 abuts against the valve needle 150. The buffer spring 130 is provided in the valve needle sleeve 120, and the driving end 111 of the valve rod 110 is connected to the buffer slider 140 through the buffer spring 130.

For example, the nut 240 is provided with a mounting hole 241 extending axially therethrough, and the valve rod 110 passes through the mounting hole 241 and is threadedly connected with the nut 240. The valve rod 110 includes a guide rod segment and a threaded rod segment. The mounting hole 241 includes a guide hole segment adapted to the guide rod segment, and a threaded hole segment adapted to the threaded rod segment. The guide rod segment and the guide hole segment are disposed by interference fit or clearance fit, and the threaded rod section and the threaded hole section are by thread fit. The valve seat 220 is provided with a valve core seat 230, and the valve core seat 230 is provided with a valve port 231 corresponding to the valve needle 150. The valve needle 150 is detachably installed in the valve port 231. In this way, by driving the magnetic rotor 250 to rotate through the coil, the rotational movement of the magnetic rotor 250 can be converted into the axial movement of the valve rod 110, and the valve rod 110 drives the valve needle 150 connected thereto to rise or fall, thereby controlling the flow rate of the electronic expansion valve 200.

In the embodiment of the present application, the valve rod 110, the nut 240, and the valve needle 150 are provided coaxially. The valve rod 110 has a driving end 111 close to the valve needle 150. The valve rod 110 is passed through the first open end 121 of the valve needle sleeve 120, and the driving end 111 of the valve rod 110 is located in the valve needle sleeve 120. The driving end 111 of the valve rod 110 is in clearance fit with the first open end 121 of the valve needle sleeve 120, so that the valve rod 110 can move relative to the valve needle sleeve 120 along its axial direction. The valve needle 150 is mounted on the second open end 123 of the valve needle sleeve 120, and the valve needle 150 and the second open end 123 of the valve needle sleeve 120 are in an interference fit. Both the buffer spring 130 and the buffer slider 140 are located in the valve needle sleeve 120, and the buffer slider 140 is opposite to and spaced from the driving end 111 of the valve rod 110. The buffer spring 130 is disposed between the buffer slider 140 and the driving end 111 of the valve rod 110 to connect the buffer slider 140 and the driving end 111 of the valve rod 110. For example, the buffer spring 130 is a compression spring. In this way, when the valve rod 110 moves along its axial direction relative to the valve needle sleeve 120, the valve rod 110 can drive the buffer slider 140 to rotate through the buffer spring 130, while the valve needle 150 remains stationary, thereby preventing the valve needle 150 from rotating relative to the valve port 231 and causing wear. After the valve rod 110 moves along its axial direction to abut against the valve needle sleeve 120, the valve rod 110 can drive the valve needle 150 to move together through the valve needle sleeve 120, thereby controlling the opening degree of the valve port 231. In other words, the control of the flow rate of the electronic expansion valve 200 can be implemented. In an embodiment, the valve rod 110, the buffer spring 130, the buffer slider 140, and the valve needle sleeve 120 are provided coaxially, so as to ensure that the valve needle assembly 100 has a satisfactory coaxiality.

In the embodiment of the present application, the buffer slider 140 abuts against the valve needle 150, so that the buffer slider 140 can rotate relative to the valve needle 150, which prevents the valve needle 150 from rotating relative to the valve port 231, thereby preventing the valve needle 150 from wearing out. The buffer slider 140 can be made of a material with high lubricity, which can reduce the friction between the buffer slider 140 and the valve needle 150, thereby reducing the wear caused by the rotation of the buffer slider 140 relative to the valve needle 150. In an embodiment, the buffer slider 140 is made of non-metallic material, such as but not limited to, the buffer slider 140 is made of plastic material. For example, the plastic material is polyphenylene sulfide (PPS). By using the buffer slider 140 made of non-metallic material, the frictional force between the buffer slider 140 and the valve needle 150 made of metal can be reduced, thereby reducing the wear caused when the buffer slider 140 rotates relative to the valve needle 150.

The valve needle assembly 100 of the present application includes a valve needle sleeve 120, a valve rod 110, a valve needle 150, a buffer slider 140 and a buffer spring 130; the valve needle sleeve 120 has a first open end 121 and a second open end 123 opposite to each other; the valve rod 110 has a driving end 111; the valve rod 110 is set through the first open end 121, and the driving end 111 of the valve rod 110 is provided in the valve needle sleeve 120; the valve needle 150 is mounted on the second open end 123 of the valve needle sleeve 120; the buffer slider 140 is provided in the valve needle sleeve 120, and the buffer slider 140 abuts against the valve needle 150; the buffer spring 130 is disposed in the valve needle sleeve 120, and the driving end 111 of the valve rod 110 is connected to the buffer slider 140 through the buffer spring 130. In this way, when the valve needle 150 is opened from the fully closed state to the first position (that is, the position where the contact force between the valve port 231 and the valve needle 150 is equal to the pressure of the refrigerant), the valve needle 150 and the valve port 231 always maintain sealing contact, and the valve rod 110 drives the buffer spring 130 and the buffer slider 140 to rotate together, while the valve needle 150 remains stationary; when the valve needle 150 continues to open to the second position (that is, the position of the valve opening pulse point), the valve needle 150 and the valve port 231 continue to maintain sealing contact at first, and after the valve rod 110 moves axially to abut against the valve needle sleeve 120, the valve needle 150 moves together with the valve rod 110. Therefore, the valve needle assembly 100 of the present application greatly reduces wear between the valve needle 150 and the valve port 231, prolongs the service life of the valve needle assembly 100, and improves the reliability of the electronic expansion valve 200.

It should be pointed out that, in an embodiment, the valve needle assembly 100 may only be composed of the valve needle sleeve 120, the valve rod 110, the valve needle 150, the buffer slider 140 and the buffer spring 130, so that the valve needle assembly 100 has fewer components, which can save costs.

Figure 4:
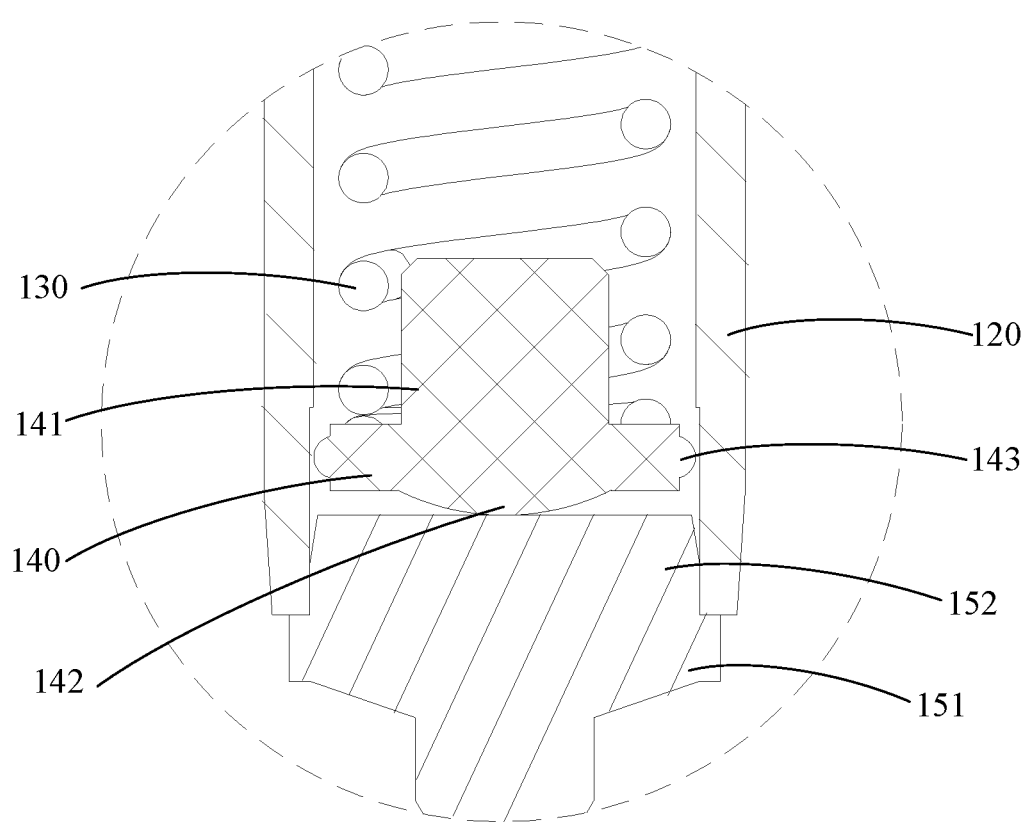
FIG. 4 is a partial enlarged view of A in FIG. 3.

As shown in FIG. 3 and FIG. 4, in an embodiment, a flange portion 112 is provided on the peripheral wall of the driving end 111 of the valve rod 110, and the flange portion 112 is located in the valve needle sleeve 120; the first open end 121 of the valve needle sleeve 120 is provided with a constricted portion 122 abutting against the flange portion 112; one end of the buffer spring 130 is sleeved on the driving end 111 of the valve rod 110 and abuts against the flange portion 112.

In this way, when the valve needle 150 is opened from the fully closed state to the first position (that is, the position where the contact force between the valve port 231 and the valve needle 150 is equal to the pressure of the refrigerant), the valve needle 150 and the valve port 231 always maintain sealing contact; there is a gap between the flange portion 112 and the constricted portion 122 of the valve needle sleeve 120, and the valve rod 110 drives the buffer spring 130 and the buffer slider 140 to rotate together, while the valve needle 150 remains stationary; when the valve needle 150 continues to open to the second position (that is, the position of the valve opening pulse point), the valve needle 150 and the valve port 231 continue to maintain sealing contact at first, and after the valve rod 110 moves axially until the flange portion 112 abuts against the constricted portion 122 of the valve needle sleeve 120 (that is, the gap between the flange portion 112 and the constricted portion 122 of the valve needle sleeve 120 is zero), the valve needle 150 moves together with the valve rod 110.

In this embodiment, the flange portion 112 is provided in an annular shape. It can be understood that in other embodiments, the flange portion 112 may also be provided in an arc shape or in a block shape, which is not specifically limited. On the one hand, the flange portion 112 can fix the buffer spring 130, and on the other hand, can prevent the driving end 111 of the valve rod 110 from falling out of the valve needle sleeve 120. In addition, in this embodiment, the cross-sectional diameter of the valve needle sleeve 120 is greater than the cross-sectional diameter of the flange portion 112, which can reduce the frictional force between the flange portion 112 and the inner wall surface of the valve needle sleeve 120, so that the valve rod 110 can move smoothly relative to the valve needle sleeve 120.

As shown in FIG. 3 and FIG. 4, further, the buffer slider 140 is provided with a positioning column 141 on the side facing the valve rod 110, and the positioning column 141 is opposite to and spaced apart from the driving end 111 of the valve rod 110. The other end of the buffer spring 130 is sleeved on the positioning column 141 and abuts against the buffer slider 140. In this way, by providing the positioning column 141, on the one hand, the buffer spring 130 can be fixed and installed, and on the other hand, the buffer spring 130 can also be positioned, in order to ensure that the buffer spring 130 always moves along the axial direction of the valve rod 110 without deviation.

As shown in FIG. 4, in an embodiment, in order to further reduce the contact area between the buffer slider 140 and the valve needle 150, thereby reducing the wear caused when the buffer slider 140 rotates relative to the valve needle 150, the buffer slider 140 is provided with a protrusion 142 protruding toward the valve needle 150, and the buffer slider 140 abuts against the valve needle 150 through the protrusion 142. In an embodiment, the surface of the protrusion 142 is an arc surface. By providing the arc-shaped protrusion 142, on the one hand, the contact area between the buffer slider 140 and the valve needle 150 can be reduced; and on the other hand, the arc-shaped protrusion 142 can serve as a good fulcrum, enable the buffer slider 140 to rotate at this fulcrum without positional deviation, and ensure that the valve rod 110, the valve needle sleeve 120, the buffer spring 130 and the buffer slider 140 always maintain a high degree of coaxiality.

As shown in FIG. 3 and FIG. 4, in an embodiment, the inner diameter of the valve needle sleeve 120 is larger than the outer diameter of the buffer slider 140. In this way, the frictional force between the buffer slider 140 and the inner wall of the valve needle sleeve 120 can be reduced, so that the buffer slider 140 can rotate relative to the valve needle sleeve 120 very smoothly.

In order to avoid the position displacement of the buffer slider 140 during the rotation process, a limiting protrusion 143 can be provided on the outer wall surface of the buffer slider 140, and the limiting protrusion 143 is disposed along the circumferential direction of the buffer slider 140. In this way, by providing the limiting protrusion 143 to limit the buffer slider 140, the position deviation of the buffer slider 140 during the rotation process can be avoided.

In this embodiment, the limiting protrusion 143 is integrally formed with the buffer slider 140. It can be understood that, in other embodiments, the limiting protrusion 143 and the buffer slider 140 may be provided as separate bodies, which are not specifically limited here. There can be various structures of the limiting protrusions 143. For example, in an embodiment, there are at least two limiting protrusions 143, and the at least two limiting protrusions 143 are distributed along the circumferential direction of the buffer slider 140 at interval(s). By providing a plurality of limiting protrusions 143, the buffer slider 140 can be effectively prevented from shifting. For another example, in another embodiment, there is one limiting protrusion 143, and the limiting protrusion 143 is an annular rib extending along the circumferential direction of the buffer slider 140.

As shown in FIG. 3 and FIG. 4, in an embodiment, the first open end 121 of the valve needle sleeve 120 is a through opening through the upper end of the valve needle sleeve 120, and the driving end 111 of the valve rod 110 is in clearance fit with the through opening. The second open end 123 of the valve needle sleeve 120 is an opening, and the outer wall of the valve needle 150 is in interference fit with the opening. It can be understood that, in other embodiments, the second open end 123 of the valve needle sleeve 120 may also be a through opening through the lower end of the valve needle sleeve 120, which is not specifically limited here.

In order to improve the tightness and reliability of the connection between the valve needle 150 and the valve needle sleeve 120, the valve needle 150 is welded to the second open end 123 of the valve needle sleeve 120. For example, the valve needle 150 includes a main body 151 and a mounting portion 152 extending from the main body 151 toward the buffer slider 140. The mounting portion 152 is inserted into the valve needle sleeve 120 and is in interference fit with the second open end 123 (opening) of the valve needle sleeve 120. The buffer slider 140 abuts against the upper surface of the mounting portion 152.

In addition, as shown in FIG. 1, FIG. 2 and FIG. 3, in an embodiment, the nut 240 extends toward the valve core seat 230 to approach or abut against the valve core seat 230. It should be pointed out that when the nut 240 extends toward the valve core seat 230 to abut against the valve core seat 230, the coaxiality among the nut 240, the valve rod 110 and the valve port 231 can be additionally improved.

Further, a refrigerant outlet (or a refrigerant passage) 242 is provided on the side wall of the nut 240 near one end of the valve port 231, so as to facilitate the flow of refrigerant from the refrigerant outlet 242 to the valve port 231. Here, it should be pointed out that, by providing the refrigerant outlet 242 on the nut 240, when the refrigerant flows through the refrigerant outlet 242, the air bubbles in the refrigerant can be broken, thereby preventing the air bubbles in the refrigerant from generating loud noises when flowing through the valve port 231. Therefore, the arrangement of the refrigerant outlet 242 can also reduce noises. The shape of the refrigerant outlet 242 may be a circle, an oval, a square or other irregular shapes, etc., and is not specifically limited herein.

The present application also provides a refrigeration device, which includes an electronic expansion valve 200, and the specific structure of the electronic expansion valve 200 refers to the above-mentioned embodiments. Since the refrigeration device adopts all the technical solutions of all the above-mentioned embodiments, it at least has all the beneficial effects brought by the technical solutions of the above-mentioned embodiments, and no more detail will not be repeated here. The refrigeration device may be an air conditioner, a freezer, a refrigerator, a heat pump water heater, and the like.

The above are only some embodiments of the present application, and are not intended to limit the scope of the present application. Under the inventive concept of the present application, the equivalent structural transformations made by using the description of the application and the contents of the accompanying drawings, or direct/indirect applications in other relevant technical fields are included in the scope of the present application.

What is claimed is:

1. A valve needle assembly for an electronic expansion valve, the valve needle assembly comprising:
    a valve needle sleeve comprising:
        a first open end; and
        a second open end opposite the first open end;
    a valve rod disposed through the first open end of the valve needle sleeve and comprising a driving end disposed in the valve needle sleeve;
    a valve needle comprising:
        a mounting portion disposed within, and in an interference fit with, the second open end of the valve needle sleeve; and
        a main body portion having a diameter larger than the mounting portion and abutting against the second open end of the valve needle sleeve;
    a buffer slider disposed in the valve needle sleeve and abutting against the valve needle; and
    a buffer spring disposed in the valve needle sleeve and abutting against the driving end of the valve rod and the buffer slider.

2. The valve needle assembly according to claim 1, wherein:
    the first open end of the valve needle sleeve comprises a constricted portion;
    the buffer spring comprises a first end surrounding a portion of the driving end of the valve rod; and
    the driving end of the valve rod comprises a flange portion disposed in the valve needle sleeve and abutting against the constricted portion of the first open end of the valve needle sleeve and the first end of the buffer spring.

3. The valve needle assembly according to claim 2, wherein:
    the buffer slider comprises a positioning column disposed on a side of the buffer slider toward the valve rod and a non-positioning column portion disposed on a side of the buffer slider away from the valve rod; and
    the buffer spring comprises a second end surrounding the positioning column.

4. The valve needle assembly according to claim 2, wherein a diameter of the valve needle sleeve is larger than a diameter of the flange portion of the driving end of the valve rod.

5. The valve needle assembly according to claim 1, wherein
    the buffer slider comprises a protrusion abutting against the valve needle.

6. The valve needle assembly according to claim 5, wherein the protrusion comprises an arcuate surface abutting against the valve needle.

7. The valve needle assembly according to claim 1, wherein the buffer slider comprises an outer wall and at least one limiting protrusion extending from the outer wall towards the valve needle sleeve.

8. The valve needle assembly according to claim 7, wherein the at least one limiting protrusion comprises at least two limiting protrusions that are distributed circumferentially around the buffer slider.

9. The valve needle assembly according to claim 7, wherein the at least one limiting protrusion comprises an annular rib extending from the outer wall.

10. The valve needle assembly according to claim 1, wherein an inner diameter of the valve needle sleeve is larger than an outer diameter of the buffer slider.

11. The valve needle assembly according to claim 1, wherein the buffer spring is in compression.

12. The valve needle assembly according to claim 1, wherein the buffer slider is plastic.

13. An electronic expansion valve comprising:
    a nut forming a mounting hole; and
    a valve needle assembly comprising:
        a valve needle sleeve comprising:
            a first open end; and
            a second open end opposite the first open end;
        a valve rod disposed through the first open end of the valve needle sleeve and comprising a driving end disposed in the valve needle sleeve;
        a valve needle comprising:
            a mounting portion disposed within, and in an interference fit with, the second open end of the valve needle sleeve; and
            a main body portion having a diameter larger than the mounting portion and abutting against the second open end of the valve needle sleeve;
        a buffer slider disposed in the valve needle sleeve and abutting against the valve needle; and
        a buffer spring disposed in the valve needle sleeve and abutting against the driving end of the valve rod and the buffer slider.

14. The electronic expansion valve according to claim 13, further comprising:
    a valve seat; and
    a valve core seat provided on the valve seat, wherein:
the valve core seat comprises a valve port;
the valve needle is detachably mounted on the valve port;
the nut is connected to the valve seat; and
the nut extends toward the valve core seat to approach or abut against the valve core seat.

15. The electronic expansion valve according to claim 14, wherein the nut comprises a side wall adjacent to the valve core seat and a refrigerant outlet disposed on the side wall.

16. A refrigeration device comprising the electronic expansion valve according to claim 13.

\* \* \* \* \*